US005647887A

United States Patent [19]
Meissner

[11] Patent Number: 5,647,887
[45] Date of Patent: *Jul. 15, 1997

[54] FLUIDIZABLE BED CO-PROCESSING FINES IN A DIRECT REDUCTION SYSTEM

[75] Inventor: David C. Meissner, Charlotte, N.C.

[73] Assignee: Midrex International B.V. Rotterdam, Zurich Branch, Zurich, Switzerland

[*] Notice: The term of this patent shall not extend beyond the expiration date of Pat. No. 5,435,831.

[21] Appl. No.: 423,004

[22] Filed: Apr. 13, 1995

Related U.S. Application Data

[63] Continuation-in-part of Ser. No. 289,707, Aug. 12, 1994, Pat. No. 5,435,831.

[51] Int. Cl.$^6$ .................... C21B 13/02; C22B 5/14
[52] U.S. Cl. .................................. 75/436; 75/444
[58] Field of Search ............................ 75/436, 444

[56] References Cited

U.S. PATENT DOCUMENTS

| | | | |
|---|---|---|---|
| Re. 32,247 | 9/1986 | Stephens, Jr. | 75/11 |
| 2,481,217 | 9/1949 | Hemminger . | |
| 2,864,686 | 12/1958 | Agarwal . | |
| 3,020,149 | 2/1962 | Old . | |
| 3,236,607 | 2/1966 | Porter, Jr. . | |
| 3,251,677 | 5/1966 | Jolley . | |
| 3,251,678 | 5/1966 | Mayer . | |
| 3,257,198 | 6/1966 | Volk . | |
| 3,295,956 | 1/1967 | Whaley . | |
| 3,428,446 | 2/1969 | Locke, Jr. | 75/26 |
| 3,475,160 | 10/1969 | Heinzelmann . | |
| 3,591,363 | 7/1971 | Campbell . | |
| 3,944,413 | 3/1976 | Volk . | |
| 4,082,545 | 4/1978 | Malgarini . | |
| 4,134,907 | 1/1979 | Stephens, Jr. | 260/449.6 M |
| 4,257,781 | 3/1981 | Stephens, Jr. | 48/197 R |
| 4,260,412 | 4/1981 | Summers | 75/35 |
| 4,358,310 | 11/1982 | Sanzenbacher | 75/25 |
| 4,806,158 | 2/1989 | Hirsch . | |
| 5,073,194 | 12/1991 | Stephens | 75/376 |
| 5,082,251 | 1/1992 | Whipp . | |
| 5,118,479 | 6/1992 | Stephens, Jr. | 423/148 |
| 5,137,566 | 8/1992 | Stephens, Jr. | 75/507 |
| 5,185,032 | 2/1993 | Whipp | 75/436 |
| 5,192,486 | 3/1993 | Whipp . | |
| 5,370,727 | 12/1994 | Whipp . | |
| 5,382,277 | 1/1995 | Rose . | |
| 5,433,767 | 7/1995 | Bresser . | |
| 5,435,831 | 7/1995 | Meissner | 75/444 |

FOREIGN PATENT DOCUMENTS

WO92/02824  2/1992  WIPO .................. G01N 35/00

Primary Examiner—Melvyn Andrews
Attorney, Agent, or Firm—Dougherty & Associates

[57] ABSTRACT

A method of producing direct reduced iron from pellets, lumps and fines of iron oxide. A mixture of iron oxide raw material is introduced to an apparatus which separates the lumps and pellets from the fines. The lumps and pellets are then introduced to a shaft furnace for direct reduction to iron. Fines are conveyed to a series of fluidizable beds which allows intimate contact with reducing gas to facilitate the direct reduction of the iron oxide fines to metallized iron.

9 Claims, 2 Drawing Sheets

FLUIDIZABLE BED CO-PROCESSING FINES IN A DIRECT REDUCTION SYSTEM

CROSS REFERENCE TO RELATED APPLICATION

This application is a continuation-in-part of my U.S. patent application Ser. No. 08/289,707, filed Aug. 12, 1994 now U.S. Pat. No. 5,435,831.

FIELD OF THE INVENTION

The present invention relates to a method and apparatus for direct reduction by a fluidizable bed system which enables the user to simultaneously process fines with lumps and pellets.

BACKGROUND OF THE INVENTION

Direct reduction of iron from iron oxide pellets, lump ore, or other iron oxide containing feed material is usually performed in of a direct reduction furnace, such as a vertical shaft furnace. The feed material usually contains a significant proportion of finely divided material, or "fines", often created by abrasion of the pellets or lumps during handling. These fines are usually screened out prior to reduction. Direct reduction is carried out by contacting the feed material with hot reducing gases rich in carbon monoxide and hydrogen. The reducing gas is passed through a metal oxide containing burden in the furnace and withdrawn from the top of the furnace, along with metal oxide material in the form of finely divided particles, usually generated by abrasion in the furnace. The fines must then be separated from the gas. Heretofore all fines must have been disposed of, which has usually been done by placing the fines into stock piles or attempting to mix the fines with some binder to form a usable material.

The present invention treats these removed fines by reducing them and returning them to the direct reduction system as reduced metallized iron. This greatly enhances the economics of the direct reduction process, and dramatically reduces the amount of waste fines for disposal.

DESCRIPTION OF THE PRIOR ART

Applicant is aware of the following U.S. Patents concerning fluidizable beds and the processing of fines.

| U.S. Pat. No. | Inventor | Issue Date | Title |
|---|---|---|---|
| 4,134,907 | Stephens, Jr. | 01-16-79 | PROCESS FOR ENHANCING THE FUEL VALUE OF LOW BTU GAS |
| 4,257,781 | Stephens, Jr. | 03-24-81 | PROCESS FOR ENHANCING THE FUEL VALUE OF LOW BTU GAS |
| 4,260,412 | Summers et al. | 04-07-81 | METHOD OF PRODUCING DIRECT REDUCTION IRON WITH FLUID BED COAL GASIFICATION |
| 4,358,310 | Sanzenbacher et al. | 11-09-82 | DRY COLLECTION OF METALLIZED FINES |
| 5,073,194 | Stephens et al. | 12-17-91 | PROCESS FOR CONTROLLING THE PRODUCT QUALITY IN THE CONVERSION OF REACTOR FEED INTO IRON CARBIDE |
| 5,118,479 | Stephens, Jr. | 06-02-92 | PROCESS FOR USING FLUIDIZED BED REACTOR |
| 5,137,566 | Stephens, Jr. et al. | 08-11-92 | PROCESS FOR PREHEATING IRON-CONTAINING REACTOR FEED PRIOR TO BEING TREATED IN A FLUIDIZED BED REACTOR |
| Re. 32,247 | Stephens, Jr. | 09-16-86 | PROCESS FOR THE DIRECT PRODUCTION OF STEEL |
| WO 92/02824 | Hager, et al. | 02-20-92 | METHOD FOR CONTROLLING THE CONVERSION OF IRON CONTAINING REACTOR FEED INTO IRON CARBIDE |

Locke teaches a multi-stage fluidized bed reactor wherein fine ore particles are separated from coarser particles and are each introduced into a different zone of the reactor. The −38 micron fraction is sent to the last zone of the fluid bed where it is reduced very rapidly to metallic iron, and then agglomerated because of the stickiness of the particles. The +38 micron fraction is sent to the first zone of the fluid bed reactor.

Stephens, Jr., U.S. Pat. No. 4,134,907 teaches a process for increasing the fuel value of a gas mixture of carbon monoxide and hydrogen by converting part of the hydrogen and part of the carbon in the carbon monoxide of the gas mixture to methane, which comprises continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Stephens, Jr., U.S. Pat. No. 4,257,781 discloses a process which uses coal resources economically by converting part of the hydrogen and part of the carbon in the carbon monoxide of the gas mixture to methane, thereafter continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Summers, U.S. Pat. No. 4,260,4412 teaches a method of producing direct reduced iron with fluid bed coal gasification in which a portion of cooled, recycled gas is used as coolant in the gasification chamber and a second portion of the cleaned recycled gas is heated and mixed with the hot, dust-free gasification gas to form reducing gas for the direct reduction process. Limestone is preferably mixed with the pulverized coal feed to the gasification chamber to desulfurize the gas.

Sanzenbacher, U.S. Pat. No. 4,358,310 teaches a method and apparatus for the dry collection of metallized fines from a direct reduction furnace cooling zone in which cooling gas removed from the cooling zone passes through a dust collector and the removed dust is cooled in a fluidized bed, the fluidizing gas being recirculated through an indirect cooler. The process is continuous and the fines are collected at a sufficiently low temperature for easy handling. The apparatus includes a hot gas cyclone in the cooling gas withdrawal line connected to a fluidized bed cooler, a conduit for withdrawing fluidizing gas from the fluidized bed cooler passes through a second cyclone dust collector then through an indirect cooler and returns to the fluidized bed cooler. Cool fines are withdrawn from the fluidized bed cooler into a collector.

Stephens et al., U.S. Pat. No. 5,073,194 teaches a method of controlling product quality in a conversion of reactor feed to an iron carbide-containing product in a fluidized bed reactor. A Mossbauer analysis is performed on product samples leaving the fluidized bed reactor, and a regression analysis is performed on the Mossbauer data. Depending upon the results of the regression analysis, process parameters are adjusted in order to obtain a product having a desired composition. Adjustments are made to the temperature and pressure in the fluidized bed reactor, rate of feed to the fluidized bed reactor, and the composition of the process gas which reacts with the reactor feed in the fluidized bed reactor, dependent upon the analysis results.

Stephens, Jr., et al. U.S. Pat. No. 5,118,479 teaches a process in which the fluidized bed reactor includes a baffle system to ensure the proper residence time of the feed materials. The fluidized bed reactor also provides a novel method for reducing the negative effects of thermal expansion in the reactor.

Stephens, Jr., et al. U.S. Pat. No. 5,137,566 teaches a process for the conversion of reactor feed to iron carbide. The process includes the step of preheating the reactor feed in an oxidizing atmosphere. The iron carbide produced by the process is particularly useful in the production of steel.

Stephens, Jr., U.S. Pat. No. 32,247 teaches a process for the direct production of steel from particulate iron oxides or concentrates including two major steps in which in Step (1) the iron oxides are converted to iron carbide and in Step (2) steel is produced directly from the carbide in the basic oxygen furnace or the electric furnace. In the production of the carbide the oxides are reduced and carburized in a single operation using a mixture of hydrogen as a reducing agent and carbon bearing substances such as propane primarily as carburizing agents. Iron carbide thus produced is introduced as all or part of the charge into a basic oxygen furnace to produce steel directly without the blast furnace step. In order to make the steel making process auto-thermal, heat is supplied either by using the hot iron carbide from Step (1) or preheating the iron carbide or by including sufficient fuel in the iron carbide to supply the required heat by combustion.

Hager et al., European Patent WO 92/02824 teaches a process for controlling the conversion of reactor feed to iron carbide. The reactor feed is subjected to a process gas in a fluidized bed reactor (10), and measurements (56) are taken of individual gases in the off-gas from this reaction and the temperature (64) and pressure (66). A stability phase diagram is generated based on the temperature. Different regions of the stability phase diagram are representative of different products being formed by the conversion of the reactor feed. Based on concentrations of the individual gases in the off-gas and the total pressure, a point is plotted on the stability phase diagram indicative of the favored reaction product. The process parameters can then be adjusted to insure that iron carbide can be produced from the reactor feed based on the stability phase diagram.

SUMMARY OF THE INVENTION

This invention is a method and apparatus for producing direct reduced iron from a mixture of pellets, lumps and fines by adding apparatus to effectively process the fines. The lumps and pellets are processed in a shaft reduction furnace as taught in Beggs U.S. Pat. No. 4,046,557. The invention encompasses a new method and apparatus for the direct reduction of oxide fines. Pellets, lumps and fines are all brought together and placed in a separator to separate the fines from the pellets and lumps. The pellets and lumps of iron oxide are then transported to a shaft reduction furnace where they undergo the direct reduction process. The fines are transported to a series of fluidized beds and a portion of the reduction gas from the reformer is also delivered to the series of fluidizing beds.

The reducing gas from the reformer enters the fluidized bed containing the most reduced fines. The reducing gas is passed upward through a bed of solid iron oxide fine particles with sufficient velocity for the particles to separate from one another and become freely supported in a fluid like state. At this point the total fluid frictional force of the particles is equal to or greater than the effective weight of the bed. This allows intimate contact between solid and gas, with high rates of heat transfer and uniform temperatures within the bed. This facilitates the reduction of iron oxide into metallized iron, water and carbon dioxide, the two latter components being removed from the bed.

The present invention separates +5,000 micron (+5 mm) iron oxide particles from −5,000 micron iron oxide particles, and feeds the +5,000 micron iron oxide pellets and lumps to a direct reduction shaft furnace while feeding the −5,000 micron iron oxide fines to a fluid bed system.

OBJECTS OF THE INVENTION

The principal object of the invention is to provide an improved method of processing pellets, lumps and fines in one facility.

A further object of this invention is to provide a method of reducing iron oxide fines directly to iron without blowing the vast majority of the fines out of the shaft reduction furnace.

Another object of the invention is to provide apparatus for the simultaneous processing of fines with pellets and lumps at one facility so that reformers and scrubbers are shared by both the shaft reduction furnace and the series of fluidizable beds.

BRIEF DESCRIPTION OF THE DRAWINGS

The foregoing and other objects will become more readily apparent by referring to the following detailed description and the appended drawings in which.

DETAILED DESCRIPTION

Figure 1:
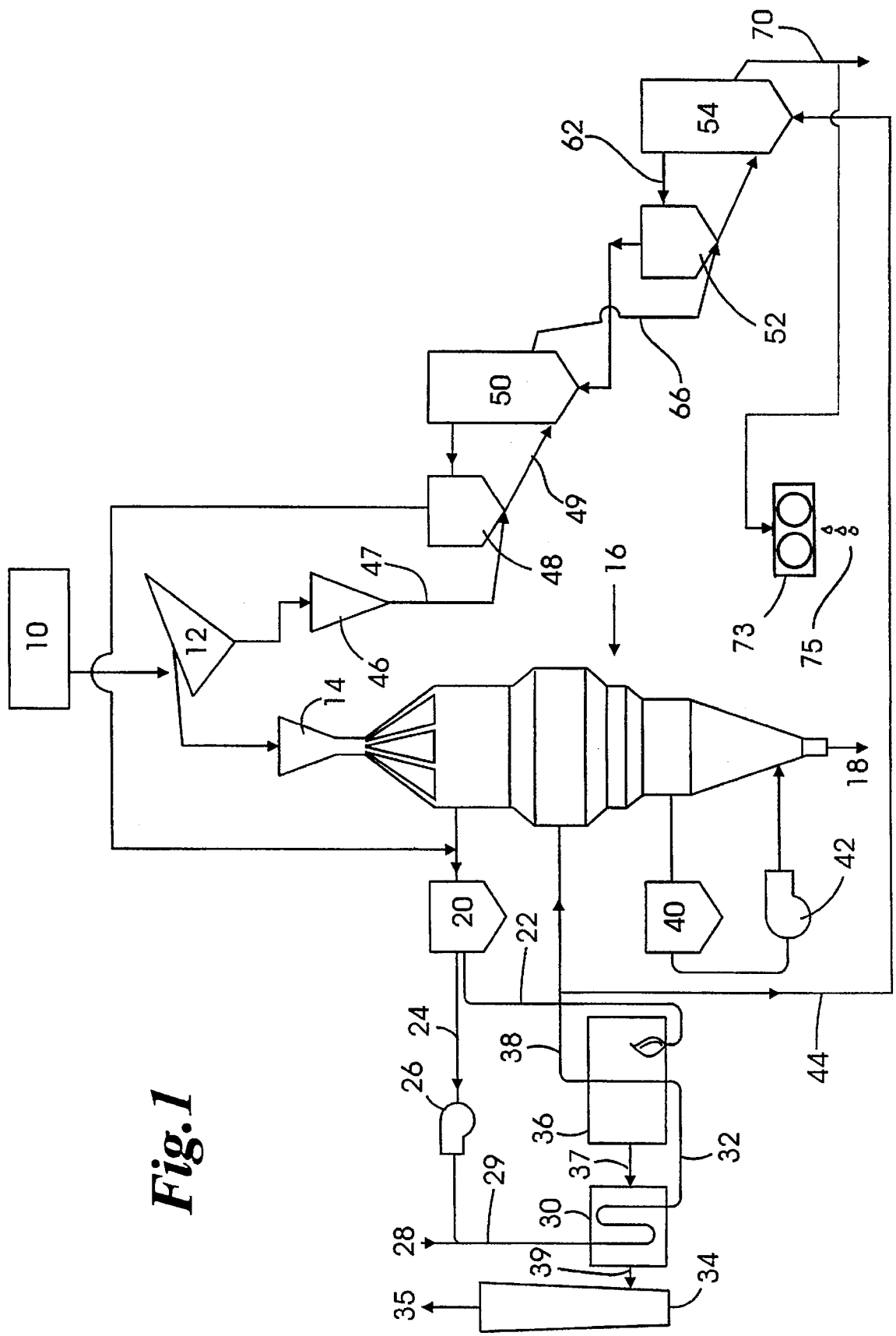
FIG. 1 is a schematic diagram of the invented process for direct reduction of iron oxide pellets, lumps and fines.

Referring now to FIG. 1, iron oxide feed 10 consisting of a mixture of pellets, lumps, and fines, is introduced into a separator apparatus 12, which can be simply a screen which allows the fine particles to pass through the openings in the screen whereas the lumps and pellets remain on the top of the screen 12 and can be removed to shaft furnace feed hopper 14 for processing in shaft furnace 16. Particles of less than about 5,000 microns (5 mm) must be screened from a mixture of pellets and/or lump, otherwise they would be blown out of the shaft furnace. The practical solution is to separate the +5,000 micron and the −5,000 micron iron oxide and to feed the +5,000 micron iron oxide to the shaft furnace and to feed the −5,000 micron iron oxide to a fluidized bed system, the improvement being that a completely separate fluidizing bed plant is not required, but the fluidizing bed system can utilize the existing gas generation and gas processing system already utilized for the shaft furnace. This improvement allows the utilization of −5,000 micron iron oxide for a small additional incremental cost of gas processing equipment. The efficiency of processing the −5,000 micron iron oxide in the fluidizing bed approaches that of the shaft furnace which processes the +5,000 micron iron oxide.

Top gas from the shaft furnace 16 is removed and passes through top gas scrubber 20 which removes impurities and particulates, and the cleaned, scrubbed top gas is then removed through pipes 22 and 24. The top gas from pipe 22 is fed into the burner of reformer 36 as fuel. The top gas from pipe 24 is then passed through a process gas compressor 26, after which it is mixed with natural gas 28 in pipe 29. The mixture of the processed top gas and natural gas is sent through heat recovery unit 30 and then through pipe 32 into the reformer 36. The mixture of the processed top gas and natural gas is reformed to produce the reducing gas which is introduced through pipe 38 into the shaft furnace 16 so that the direct reduction process can take place. The shaft furnace 16 has an associated cooling gas scrubber 40 and a cooling gas compressor 42 which recirculates the cleaned cooling gas to the cooling zone. The exhaust products from the reformer 36 are sent to the heat recovery unit 30 through a pipe 37 and exit the heat recovery unit 30 via pipe 39 to the exhaust stack 34 from which the flue gas 35 exits the system.

Because of the size and weight of the iron oxide fines, they cannot be introduced into the shaft furnace. Basically, fines are too light and are blown out of the furnace 16 with the top gas and exit the system. Therefore, a separate process is needed to allow effective processing of the fines. In the invented process, the fines enter with the pellets and lumps 10 into the separation unit 12, and are removed and collected into hopper 46. Then the fines pass through pipe 47, where they are joined by more iron oxide fines from cyclone 48, and are moved through pipe 49 into the fluidizable bed 50.

Some of the reducing gas 38 is diverted from the shaft furnace through piping 44 into the final fluidizable bed 54. This gas exits the fluidizable bed 54 through pipe 62 into the cyclone 52. Cyclone 52 throws the heavy particles such as the iron oxide fines to the outside of the unit where their weight pulls them out of the gas stream. Thereafter, the fines fall to the bottom of the cyclone where they are mixed with the fine particles coming from fluidizable bed 50 through pipe 66. Thereafter, the fines enter the final fluidizable bed 54. Finally, the reduced iron fines exit the fluidizable bed 54 through pipe 70 from which they can be collected for later processing or compacted in a hot briquetter 73 resulting in a metallized iron briquet product 75.

Figure 2:
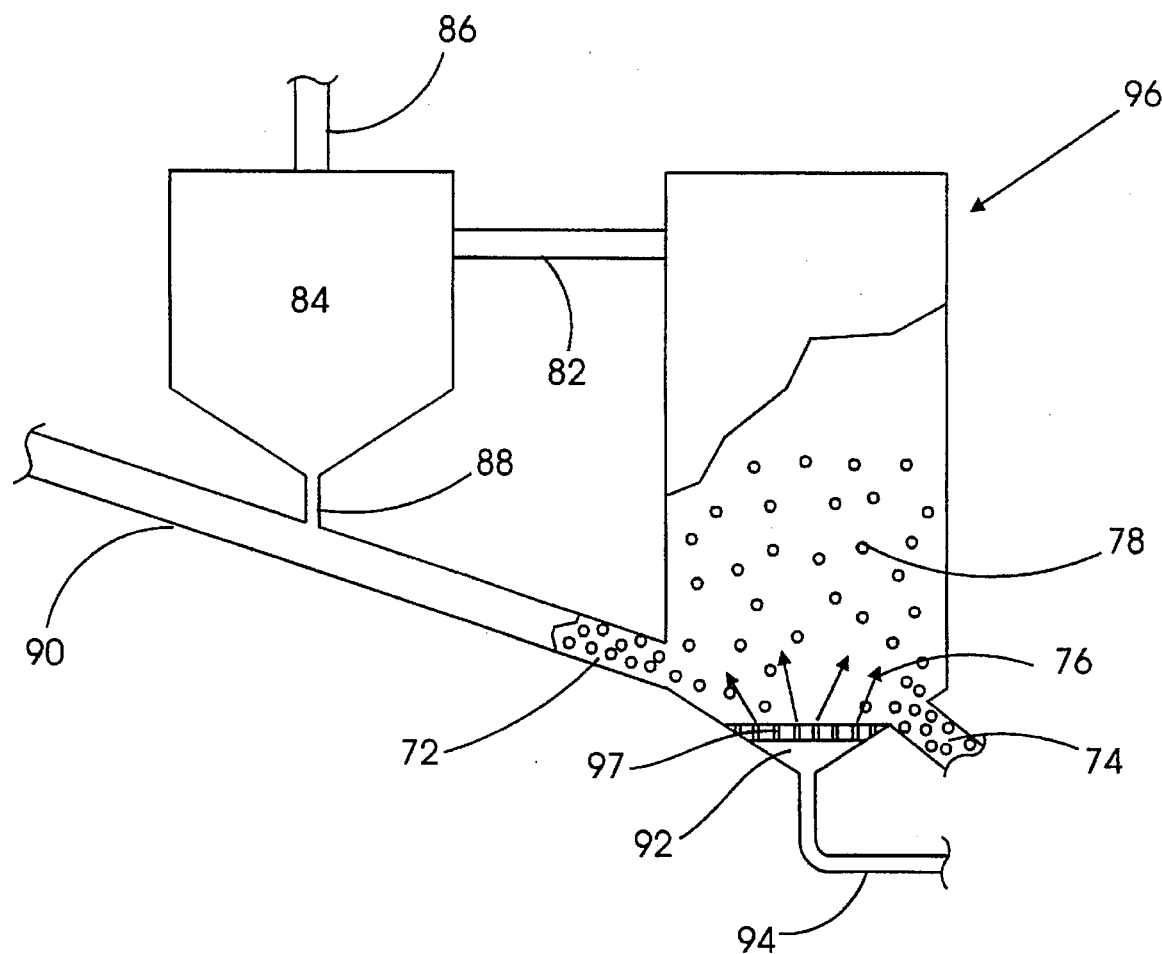
FIG. 2 is an enlarged schematic, partially sectioned view of one of a series of fluidizable beds used in the direct reduction of the iron oxide fines in accordance with the invention.

FIG. 2 shows an enlarged view of a circulating fluidizable bed. Feed pipe 90 contains iron oxide fines 72 coming from cyclone 84 or any preceding fluidizable beds flowing into the fluidizable bed 96. The reducing gas flows through feed pipe 94 into gas dispersion chamber 92 in the bottom of the fluidizable bed 96. The reducing gases pass directly into the fluidizable bed or through an orifice-containing plate 97, upward through a bed of solid iron oxide fine particles with a sufficient velocity for the particles to separate from one another and become freely supported in a fluid-like state 78. At this point, the total fluid friction force of the particles is equal to or greater than the effective weight of the bed. This allows intimate contact between the solid and gas with high rates of heat transfer and uniform temperatures within the bed. The top of the bed is undefined. This process works to facilitate the reduction of iron oxide into iron, water (steam), and carbon dioxide. Partially spent reducing gas and iron oxide fine particles leave the fluidizable bed 96 through gas exit pipe 82 and are transferred into cyclone 84. Cyclone 84 spins the reducing gas and iron oxide fine particles in a centrifugal manner causing the iron oxide fines to separate from the reducing gas and fall through particle exit pipe 88, from which they are processed back through pipe 90 into the fluidizable bed 96. The partially spent reducing gas exits the cyclone through pipe 86.

Iron oxide fine particles enter the system through feed pipe 90 either from a previous fluidizable bed or from the separator apparatus 12 shown in FIG. 1. As more particles are added to the fluid-like state 78, a number of the particles will fall out of the suspension to be collected at the bottom of the fluidizable bed 96. These particles are subsequently removed through pipe 74.

ALTERNATIVE EMBODIMENTS

Although FIG. 1 shows a series of two fluidizable beds 50 and 54, it is possible to use as few as one fluidizable bed or as many as six fluidizable beds. The number of fluidizable beds to be used in series is determined by the amount of time that the fine particles need to be suspended in the fluidizable bed, and the amount of time it will take for the fines to move through the system.

It is also possible to have more than one cyclone associated with a single fluidizable bed. This may be necessary for the last fluidizable bed and cyclone application in the series where it is desirable to avoid introduction of any iron oxide fine particles into the subsequent scrubber.

SUMMARY OF THE ACHIEVEMENT OF THE OBJECTS OF THE INVENTION

From the foregoing, it is readily apparent that I have invented an improved method and apparatus for producing direct reduced iron from a mixture of pellets, lumps and fines by adding apparatus to effectively process the fines.

The invention provides an improved method of processing pellets lumps and fines in one facility. Currently if fines are introduced directly into the shaft reduction furnace the vast majority of the fines would be blown out into the scrubber for separation from the gas stream.

This invention provides simultaneous processing of fines with pellets and lumps at one facility, so that reformers and scrubbers are shared by both the shaft reduction furnace and the series of fluidizable beds. This sharing of key components allows the fines to be processed more efficiently and economically than heretofore has been possible.

It is to be understood that the foregoing description and specific embodiments are merely illustrative of the best mode of the invention and the principles thereof, and that various modifications may be made to the process by those skilled in the art, without departing from the spirit and scope of this invention, which is therefore understood to be limited only by the scope of the appended claims.

What is claimed is:

1. A method for reducing iron oxide from a source consisting of iron oxide fines, pellets, lumps, or mixtures thereof, comprising the steps of:
   (a) separating the iron oxide fines from pellets and lumps;
   (b) conveying the pellets and lumps to a vertical shaft reducing furnace having an upper reducing zone, and a lower product discharge zone;
   (c) conveying the separated iron oxide fines to a fluidizing means;
   (d) conveying a reducing gas to the fluidizing means;
   (e) fluidizing and reducing the iron oxide fines by contact with said reducing gas to form metallized iron fines; and
   (f) collecting the reduced metallized iron fines.

2. A method according to claim 1, wherein said fines are less than 5000 microns in size.

3. A method according to claim 1, wherein said lumps and pellets are 5000 microns in size and greater.

4. A method according to claim 1, further comprising, after step (e);
   conveying reducing gas and entrained iron oxide particles to a separating means;
   separating iron oxide particles from reducing gas; and
   removing separated reducing gas.

5. A method according to claim 1, wherein the separation of iron oxide fines from pellets and lumps is accomplished by screening on a screen having openings of 5,000 microns in size.

6. A method according to claim 1 further comprising repeating the steps of:
   reducing the iron oxide fines by contact with said reducing gas;
   separating said iron oxide fines from said reducing gas; and
   removing the separated reducing gas;
   to form metallized iron fines.

7. A method according to claim 1 further comprising hot briquetting the collected reduced metallized iron fines.

8. A method for reducing iron oxide from a source consisting of iron oxide fines, pellets, lumps, or mixtures thereof, comprising:
   (a) providing a source of iron oxide lumps, pellets and fines;
   (b) separating −5000 micron iron oxide fines from +5000 micron pellets and lumps;
   (c) conveying the pellets and lumps to a vertical shaft reducing furnace having an upper reducing zone, and a lower product discharge zone;
   (d) conveying the separated iron oxide fines to a first fluidizing means;
   (e) conveying a reducing gas to the first fluidizing means;
   (f) fluidizing and reducing a portion of the iron oxide fines by contact with said reducing gas to form metallized iron fines;
   (g) conveying the separated iron oxide fines and reduced fines to a second fluidizing means;
   (h) conveying a reducing gas to the second fluidizing means;
   (i) fluidizing and reducing a portion of the iron oxide fines in the second fluidizing means by contact with said reducing gas to form metallized iron fines; and
   (k) collecting the reduced metallized iron fines.

9. A method according to claim 8 further comprising hot briquetting the metallized iron fines to form a compact metallized iron briquet product.

* * * * *